US011810368B2

(12) United States Patent
Hiei et al.

(10) Patent No.: US 11,810,368 B2
(45) Date of Patent: *Nov. 7, 2023

(54) PARKING ASSIST APPARATUS

(71) Applicant: TOYOTA JIDOSHA KABUSHIKI KAISHA, Toyota (JP)

(72) Inventors: Yu Hiei, Chiryu (JP); Daiki Maruki, Toyota (JP); Miho Shiotani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,996

(22) Filed: Dec. 17, 2021

(65) Prior Publication Data

US 2022/0237927 A1   Jul. 28, 2022

(30) Foreign Application Priority Data

Jan. 27, 2021 (JP) .................................. 2021-10807

(51) Int. Cl.
*G06V 20/58* (2022.01)
*G06V 20/56* (2022.01)
(Continued)

(52) U.S. Cl.
CPC ........... *G06V 20/586* (2022.01); *B60W 30/06* (2013.01); *G06N 5/04* (2013.01); *G06T 7/70* (2017.01);
(Continued)

(58) Field of Classification Search
CPC .... G06V 20/586; G06V 10/60; G06V 20/588; B60W 30/06; B60W 2556/10;
(Continued)

(56) References Cited

U.S. PATENT DOCUMENTS 10,155,476 B2   12/2018   Kim
10,268,201 B2 *  4/2019   Iwama ............... G05B 13/0265
(Continued)

FOREIGN PATENT DOCUMENTS

JP    2006-151370 A    6/2006
JP    2006-298115 A    11/2006
(Continued)

OTHER PUBLICATIONS

Office Action dated Dec. 5, 2022 issued in U.S. Appl. No. 17/886,904.
(Continued)

*Primary Examiner* — Daryl C Pope
(74) *Attorney, Agent, or Firm* — Sughrue Mion, PLLC

(57) ABSTRACT

A parking assist apparatus of a vehicle includes an image recognition ECU and a vehicle control ECU. The image recognition ECU extracts characteristic points contained in an image of a surrounding region of the vehicle captured during a travel. The vehicle control ECU can register, as parking lot information, the position of a parking lot and a piece of information regarding characteristic points contained in an image of a scene of the entrance of the parking lot. The vehicle control ECU can automatically park the vehicle in the registered parking lot. The image recognition ECU extracts the characteristic points contained in the image of the surrounding region when the distance between the vehicle and the entrance of the registered parking lot is equal to or shorter than a threshold distance, and does not extract the characteristic points when the distance is longer than the threshold distance.

4 Claims, 5 Drawing Sheets

(51) Int. Cl.
  *G06V 10/60* (2022.01)
  *B60W 30/06* (2006.01)
  *G06N 5/04* (2023.01)
  *G06T 7/70* (2017.01)
(52) U.S. Cl.
  CPC ............ *G06V 10/60* (2022.01); *G06V 20/588* (2022.01); *B60W 2556/10* (2020.02); *G06T 2207/30264* (2013.01)
(58) Field of Classification Search
  CPC ....... B60W 2050/146; B60W 2420/42; B60W 2554/802; B60W 50/14; G06N 5/04; G06T 7/70; G06T 2207/30264; G08G 1/168; G08G 1/0116; G08G 1/141; H04N 23/00
  See application file for complete search history.

(56) References Cited

U.S. PATENT DOCUMENTS

| | | | |
|---|---|---|---|
| 10,953,870 B2* | 3/2021 | Park | B62D 15/0285 |
| 10,988,136 B2* | 4/2021 | Kato | B60W 30/06 |
| 11,091,155 B2* | 8/2021 | Suzuki | B60W 30/09 |
| 11,117,570 B1 | 9/2021 | Broggi | |
| 2007/0097209 A1 | 5/2007 | Kubota | |
| 2009/0153362 A1 | 6/2009 | Goto et al. | |
| 2009/0281725 A1* | 11/2009 | Sakata | G08G 1/14 701/532 |
| 2010/0066515 A1 | 3/2010 | Shimazaki et al. | |
| 2011/0216194 A1* | 9/2011 | Kosaki | H04N 7/18 348/148 |
| 2011/0298926 A1 | 12/2011 | Katsunaga et al. | |
| 2014/0055615 A1 | 2/2014 | Chen | |
| 2017/0029028 A1* | 2/2017 | Kiyokawa | G08G 1/168 |
| 2017/0206785 A1 | 7/2017 | Kim et al. | |
| 2018/0246515 A1 | 8/2018 | Iwama et al. | |
| 2019/0005824 A1 | 1/2019 | Hall et al. | |
| 2019/0039605 A1 | 2/2019 | Iio et al. | |
| 2019/0220997 A1* | 7/2019 | Asai | G01C 21/3811 |
| 2022/0379880 A1* | 12/2022 | Hiei | G06T 7/74 |

FOREIGN PATENT DOCUMENTS

| | | |
|---|---|---|
| JP | 2007-124226 A | 5/2007 |
| JP | 2017-138664 A | 8/2017 |
| JP | 2019-132664 A | 8/2019 |
| WO | 2008/081655 A1 | 7/2008 |
| WO | 2018/033424 A1 | 2/2018 |

OTHER PUBLICATIONS

Notice of Allowance dated Mar. 17, 2023 issued in U.S. Appl. No. 17/886,904.
Yamamoto et al., "Proposal of an Environmental Recognition Method for Automatic Parking by an Image-based CNN", Proceedings of 2019 IEEE, International conference on Mechatronics and Automation, Aug. 4-7, 2018, Tianjin, China, pp. 833-838 (6 pages).
U.S. Appl. No. 17/886,904, filed Aug. 12, 2022.

* cited by examiner

PARKING ASSIST APPARATUS

BACKGROUND OF THE INVENTION

Field of the Invention

The present invention relates to a parking assist apparatus which can automatically park a vehicle in a parking lot present in a region around the vehicle (hereinafter referred to as a "surrounding region").

Description of the Related Art

Japanese Patent Application Laid-Open (kokai) No. 2017-138664 discloses a parking assist apparatus for a vehicle which operates in a registration mode for registering a piece of information regarding a parking lot (hereinafter referred to as "parking lot information") when the vehicle is parked in the parking lot and operates in an automatic drive mode for automatically parking the vehicle in a parking lot whose parking lot information has been registered. This parking assist apparatus includes a camera which can photograph three-dimensional objects present around the vehicle. When the parking assist apparatus is operating in the registration mode, the parking assist apparatus photographs scenes around the vehicle by using the camera and registers, as the parking lot information of that parking lot, characteristic points of three-dimensional objects (namely, three-dimensional objects present in the parking lot or three-dimensional objects present around the parking lot) in the images of the photographed scenes. Meanwhile, when the parking assist apparatus is operating in the automatic drive mode, the parking assist apparatus photographs scenes around the vehicle by using the camera and obtains the parking lot information from images of the photographed scenes. As a result, when the parking assist apparatus is operating in the automatic drive mode, the parking assist apparatus can automatically park the vehicle in the parking lot while grasping the positional relationship between the vehicle and the parking lot.

Such a parking assist apparatus is configured to extract characteristic points present on a ground surface around the vehicle and compare the extracted characteristic points with the characteristic points of a registered parking lot so as to determine whether or not the registered parking lot is present around the vehicle. Subsequently, in order to make it possible to assist a driver in parking the vehicle in the registered parking lot when the vehicle reaches the entrance of the registered parking lot, the parking assist apparatus extracts characteristic points present on the ground surface around the vehicle while traveling. In the case where the parking assist apparatus is configured as described above, the parking assist apparatus may perform extraction of characteristic points even when the vehicle is located far from the registered parking lot. Therefore, the parking assist apparatus has a problem of large processing load.

SUMMARY OF THE INVENTION

The present invention has been accomplished so as to solve the above-described problem, and one object of the present invention is to provide a parking assist apparatus which can reduce processing load.

A parking assist apparatus (100) according to the present invention includes an image processing apparatus (102), a positioning apparatus (126), and a control apparatus (101).

The image processing apparatus (102) extracts at least one characteristic point contained in an image of a surrounding region of a vehicle (10), the image being captured by a camera (113, 114, 115, 116), and obtains a piece of information regarding the characteristic point.

The positioning apparatus (126) measures the position of the vehicle (10).

The control apparatus (101) is configured to register a piece of information regarding at least one characteristic point contained in an image of a scene of an entrance of a parking lot (PS) captured by the camera (113, 114, 115, 116) and the position of the vehicle (10) at a point in time when the vehicle has stopped after having reached the entrance of the parking lot (PS), the piece of information and the position of the vehicle being registered as parking lot information of the parking lot (PS).

The control apparatus (101) is configured to determine whether or not the vehicle (10) has reached the entrance of the parking lot (PS) by comparing the registered information regarding the characteristic point with the information regarding the characteristic point contained in the image of the surrounding region of the vehicle (10) captured by the camera (113, 114, 115, 116), and to assist a driver of the vehicle (10) in parking the vehicle (10) into the parking lot (PS) whose parking lot information has been registered, in the case where the control apparatus (101) determines that the vehicle (10) has reached the entrance of the parking lot (PS) whose parking lot information has been registered.

When the distance between the vehicle (10) and the entrance of the parking lot (PS) whose parking lot information has been registered becomes equal to or shorter than a threshold distance while the vehicle (10) is traveling, the image processing apparatus (102) extracts the characteristic point contained in the image of the surrounding region of the vehicle (10) captured by the camera (113, 114, 115, 116).

When the distance is longer than the threshold distance, the image processing apparatus (102) does not extract the characteristic point contained in the image of the surrounding region of the vehicle (10) captured by the camera (113, 114, 115, 116).

According to the present invention, when the distance between the vehicle (10) and the entrance of the parking lot whose parking lot information has been registered (hereinafter referred to as the "registered parking lot (PS)") is longer than the threshold distance, the image processing apparatus (102) does not extract the characteristic point present in the surrounding region of the vehicle (10). Accordingly, the processing load of the image processing apparatus (102) can be reduced. Furthermore, according to the present invention, erroneous recognition of the registered parking lot (PS) can be prevented or restrained. Namely, even in the case where there exists a different parking lot which is similar to the registered parking lot (PS) in terms of the information regarding the characteristic point contained in the parking lot information, when the distance between the different parking lot and the registered parking lot (PS) is large, the image processing apparatus (102) does not extract characteristic points associated with the different parking lot. Accordingly, it is possible to prevent or restrain erroneous recognition of the different parking lot as the registered parking lot (PS).

The control apparatus (101) and the image processing apparatus (102) may be configured as follows.

The control apparatus (101) registers, as the parking lot information, a first position ($P_1$) which is the position at which the vehicle (10) has stopped after having reached the entrance of the parking lot (PS), a first direction ($D_1$) which is a direction of the vehicle (10) at the first position (P₁), and a direction in which the parking lot (PS) is present in relation to the vehicle (10) located at the first position (P₁).

The control apparatus (101) determines, through inference, whether the parking lot (PS) whose parking lot information has been registered is present on a left side or a right side of the vehicle (10), while the vehicle (10) is traveling, on the basis of the registered parking lot information and a direction of the vehicle (10) inferred on the basis of a change over time in the position of the vehicle (10) obtained from the positioning apparatus (126).

The image processing apparatus (102) extracts the characteristic point from an area which is a part of the surrounding region of the vehicle (10) and is located on the side where presence of the parking lot (PS) whose parking lot information has been registered is inferred, and the image processing apparatus (102) does not extract the characteristic point from an area which is another part of the surrounding region of the vehicle (10) and is located on the side where presence of the parking lot (PS) whose parking lot information has been registered is not inferred.

In the case where the parking lot information is registered in the parking assist apparatus (100), although the image processing apparatus (102) extracts a characteristic point(s) present on the side where presence of the registered parking lot is inferred, the image processing apparatus (102) does not extract a characteristic point(s) present on the side where presence of the registered parking lot is not inferred. Accordingly, the processing load of the image processing apparatus (102) can be reduced. By reducing the processing load of the image processing apparatus (102), the processing capability of the image processing apparatus (102) can be allotted to extraction of characteristic points present on the side where the presence of the registered parking lot is inferred.

The control apparatus (101) may be configured such that, when the vehicle (10) starts to move from a parking lot (PS) for which the position of the vehicle (10) at a point in time when the vehicle (10) has stopped after having reached the entrance of the parking lot (PS) has not yet been registered, the control apparatus (101) accumulatively stores a piece of travel history information which contains a change in travel direction and a travel distance of the vehicle (10) from the parking lot (PS), and, in the case where it becomes possible to obtain the position of the vehicle (10) from the positioning apparatus (126) after the vehicle (10) has started to move from the parking lot (PS), the control apparatus (101) back-calculates the position of the parking lot (PS) from the position of the vehicle (10) and the travel history information, and registers, as the position of the parking lot (PS), the position obtained through the back-calculation.

By virtue of this configuration, the position of the parking lot (PS) can be registered after the vehicle (10) has left the parking lot (PS). After registration of the position of the parking lot (PS), as described above, it is possible to prevent or restrain erroneous recognition of a different parking lot, which is not the registered parking lot, as the registered parking lot. Also, the processing load of the image processing apparatus (102) can be reduced.

The control apparatus (101) may be configured such that, when the vehicle (10) starts to move from a parking lot (PS) for which the first direction (D₁) has not yet been registered, the control apparatus (101) accumulatively stores a piece of travel history information which contains a change in travel direction from the parking lot (PS), and, in the case where it becomes possible, after the vehicle (10) has started to move from the parking lot (PS), to infer the direction of the vehicle (10) on the basis of a change over time in the position of the vehicle (10) obtained from the positioning apparatus (126), the control apparatus (101) back-calculates the first direction (D₁) from the inferred direction of the vehicle (10) and the travel history information, and registers the first direction obtained through the back-calculation.

By virtue of this configuration, the direction of the vehicle (10) at the time when the vehicle (10) has reached the entrance of the parking lot (PS) can be registered. After registration of the direction of the vehicle (10) at the time when the vehicle (10) has reached the entrance of the parking lot (PS), as described above, the processing load of the image processing apparatus (102) can be reduced, and the processing capability of the image processing apparatus (102) can be allotted to extraction of characteristic points present on the side where presence of the registered parking lot is inferred.

DESCRIPTION OF THE PREFERRED EMBODIMENT

Figure 1:
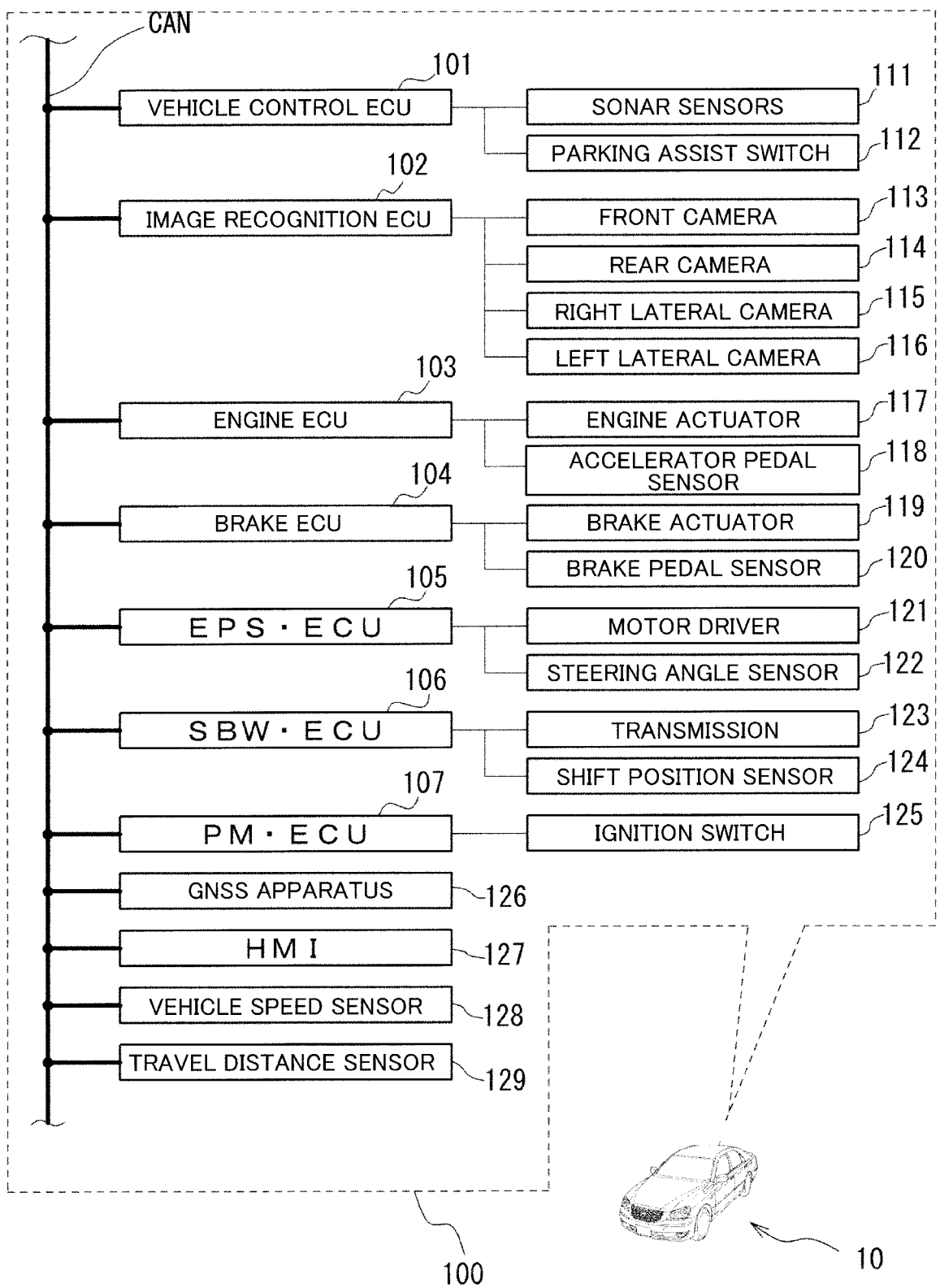
FIG. 1 is a block diagram showing a vehicle parking assist apparatus.

A parking assist apparatus 100 according to an embodiment of the present invention is applied to a vehicle 10. In the following description, the parking assist apparatus 100 according to the embodiment of the present invention may be referred to as the "present apparatus 100." As shown in FIG. 1, the present apparatus 100 includes a vehicle control ECU 101, an image recognition ECU 102, an engine ECU 103, a brake ECU 104, an EPS ECU 105, an SBW ECU 106, and a PM ECU 107. Each ECU includes a microcomputer. The microcomputer includes a CPU, a ROM, a RAM, a readable and writable non-volatile memory, an interface, etc. The CPU realizes various functions by executing instructions (programs, routines) stored in the ROM. These ECUs are connected to one another through a CAN (controller area network) in such a manner that the ECUs can exchange data (can communicate) with one another. Accordingly, the result of detection by a sensor connected to a certain ECU and operations performed on a switch, etc. connected to the certain ECU can be obtained by other ECUs different from the certain ECU.

A plurality of sonar sensors 111 and a parking assist switch 112 are connected to the vehicle control ECU 101. Each sonar sensor 111 is a known sensor which utilizes an ultrasonic wave. Each sonar sensor 111 radiates an ultrasonic wave to a predetermined range and receives a reflection wave; i.e., the ultrasonic wave reflected by an object. On the basis of a time between transmission of the ultrasonic wave and reception of the reflection wave (reflected ultrasonic wave), each sonar sensor 111 determines whether or not a three-dimensional object is present, detects the distance between the sonar sensor and the three-dimensional object, and transmits the result of the detection to the vehicle control ECU 101. The parking assist switch 112 is a switch which can be operated by a user (driver) of the vehicle 10. The vehicle control ECU 101 can detect operations performed on the parking assist switch 112.

A front camera 113, a rear camera 114, a right lateral camera 115, and a left lateral camera 116 are connected to the image recognition ECU 102. The front camera 113, which is provided at an approximately central portion of a front bumper in a vehicle width direction, photographs a scene in front of the vehicle 10 and generates image data (hereinafter referred to as the "front image data"). The rear camera 114, which is provided at a wall portion of a rear trunk of the vehicle 10, photographs a scene behind the vehicle 10 and generates image data (hereinafter referred to as the "rear image data"). The right lateral camera 115, which is provided on a right-side door mirror, photographs a scene on the right side of the vehicle 10 and generates image data (hereinafter referred to as the "rightward lateral image data"). The left lateral camera 116, which is provided on a left-side door mirror, photographs a scene on the left side of the vehicle 10 and generates image data (hereinafter referred to as the "leftward lateral image data"). Each of the cameras 113, 114, 115, and 116 repeatedly transmits the generated image data to the image recognition ECU 102.

The image recognition ECU 102 generates surrounding image data by using the front image data, the rear image data, the rightward lateral image data, and the leftward lateral image data which are received from the cameras 113, 114, 115, and 116, respectively. An image displayed (produced) on the basis of the surrounding image data will be referred to as a "surrounding image." The surrounding image is an image corresponding to at least a partial area of a surrounding region of the vehicle 10 and includes camera view images and composite images. The camera view images are images whose viewpoints are positions where the lens of the cameras 113, 114, 115, and 116 are disposed. The composite images include an image (referred to also as a "virtual viewpoint image") obtained by viewing the surrounding of the vehicle 10 from a virtual viewpoint set at an arbitrary position around the vehicle 10. A method of producing this virtual viewpoint image is well known (see, for example, Japanese Patent Application Laid-Open (kokai) Nos. 2012-217000, 2016-192772, and 2018-107754).

The image recognition ECU 102 can extract one or more characteristic points contained in the surrounding image data by performing a known image analysis process on the generated surrounding image data. The characteristic point is a small region which is contained in the surrounding image data and which has a brightness change equal to or greater than a threshold value (in other words, a region where brightness changes sharply). Furthermore, the image recognition ECU 102 obtains a piece of grayscale information of an area containing the detected characteristic point(s) (hereinafter referred to as the "characteristic area"). Specifically, the image recognition ECU 102 sets a square area whose center is located at one obtained characteristic point and whose sides have a predetermined length as a characteristic area corresponding to the one characteristic point, and divides the set characteristic area into a plurality of divisional areas (specially, 25 square areas arranged in a matrix of 5×5). Subsequently, the image recognition ECU 102 obtains the brightness of each divisional area and computes, for each divisional area, a difference from the average brightness (namely, the average of the brightnesses of all the divisional areas) (=(the brightness of each divisional area)−(the average of the brightnesses of all divisional areas). The image recognition ECU 102 uses the computed difference as grayscale information representing the tendency of variation of brightness in each characteristic area.

The image recognition ECU 102 can store a piece of information—which contains a piece of information representing the position (three-dimensional position) of each detected characteristic point and a piece of grayscale information of a characteristic area corresponding to the characteristic point—in the non-volatile memory, as information regarding each characteristic point (hereinafter referred to as "characteristic point information"), in such a manner that the characteristic point information is related to a piece of ID information for identifying the characteristic point. Furthermore, the image recognition ECU 102 transmits the characteristic point information to the vehicle control ECU 101 every time a predetermined period of time elapses.

The engine ECU 103 is connected to an engine actuator 117 and an accelerator pedal sensor 118. The engine actuator 117 includes a throttle valve actuator for changing the opening of a throttle valve of an engine (internal combustion engine), which is a drive power source of the vehicle 10. The accelerator pedal sensor 118 is configured to obtain an operation amount of an unillustrated accelerator pedal. The engine ECU 103 can change torque generated by the engine by driving the engine actuator 117 in accordance with the operation amount of the accelerator pedal. The torque generated by the engine is transmitted to drive wheels via a transmission 123. In this manner, the engine ECU 103 can control the drive power of the vehicle 10 by controlling the engine actuator 117. Notably, in the case where the vehicle 10 is a hybrid vehicle, the engine ECU 103 can control the drive power of the vehicle 10 which is generated by either or both of "an engine and a motor" which serve as drive power sources. Furthermore, in the case where the vehicle 10 is an electric vehicle, the engine ECU 103 can control the drive power of the vehicle 10 which is generated by a motor which serves as a drive power source.

The vehicle control ECU 101 can transmit a drive instruction to the engine ECU 103. When the engine ECU 103 receives the drive instruction from the vehicle control ECU 101, the engine ECU 103 controls the engine actuator 117 automatically in accordance with the received drive instruction (namely, without requiring the driver to operate the accelerator pedal).

The brake ECU 104 is connected to a brake actuator 119 and a brake pedal sensor 120. The brake pedal sensor 120 is configured to obtain an operation amount of an unillustrated brake pedal. The brake ECU 104 activates the brake actuator 119 in accordance with the operation amount of the brake pedal, thereby applying to the wheels of the vehicle braking forces which are proportional to the operation amount of the brake pedal.

The vehicle control ECU 101 can transmit a braking instruction to the brake ECU 104. When the brake ECU 104 receives the braking instruction from the vehicle control ECU 101, the brake ECU 104 controls the brake actuator 119 in accordance with the received braking instruction. Therefore, the brake ECU 104 can control the braking force of the vehicle 10 automatically by controlling the brake actuator 119 (namely, without requiring the driver to operate the brake pedal).

The EPS ECU 105 is a control apparatus of a known electric power steering system. The EPS ECU 105 is connected to a motor driver 121 for a steering motor and a steering angle sensor 122. The steering motor generates torque by using electric power supplied from the motor driver 121. By using the generated torque, the steering motor can generate steering assist torque and steer the left and right steerable wheels of the vehicle. Namely, the steering motor can change the steering angle of the vehicle 10. Furthermore, the EPS ECU 105 is connected to the steering angle sensor 122. The steering angle sensor 122 is configured to detect the steering angle of a steering wheel of the vehicle 10 and output a signal representing the steering angle. The EPS ECU 105 can apply steering torque (steering assist torque) to an unillustrated steering mechanism by driving the steering motor, thereby assisting the driver in performing steering operation.

The vehicle control ECU 101 can transmit a steering instruction to the EPS ECU 105. When the EPS ECU 105 receives the steering instruction from the vehicle control ECU 101, the EPS ECU 105 controls the steering motor in accordance with the received steering instruction. In this manner, the vehicle control ECU 101 can change the steering angle of the steerable wheels of the vehicle 10 via the EPS ECU 105 automatically (namely, without requiring steering operation by the driver).

The SBW ECU 106 is connected to the transmission 123 and/or a drive direction changeover mechanism (not shown) and is also connected to a shift position sensor 124. The shift position sensor 124 detects the position of a sift lever which serves as a movable portion of a gear shift operation section. The sift lever is selectively moved to a park position (P), a drive position (D), and a reverse position (R). The SBW ECU 106 receives from the shift position sensor 124 a signal representing the position of the shift lever and controls the transmission 123 and/or drive direction changeover mechanism (not shown) of the vehicle 10 on the basis of the position of the shift lever (namely, performs shift control of the vehicle 10).

The PM ECU 107 controls electric power supplied to various portions of the vehicle 10. An ignition switch 125 is connected to the PM ECU 107. Upon detection of an operation of turning the ignition switch 125 on, the PM ECU 107 starts the supply of electric power for operation to the various portions of the vehicle 10. Upon detection of an operation of turning the ignition switch 125 off, the PM ECU 107 stops the supply of electric power for operation to the various portions of the vehicle 10.

A GNSS apparatus 126 repeatedly receives radio waves radiated by positioning satellites and measures the position (specifically, longitude and latitude) of the vehicle 10 on the basis of the received radio waves. The GNSS apparatus 126 repeatedly transmits a signal representing the measured position of the vehicle 10 to the vehicle control ECU 101.

The vehicle control ECU 101 can infer the direction of the vehicle 10 (hereinafter referred to as the "vehicle direction") on the basis of a change over time in the position of the vehicle 10 measured by the GNSS apparatus 126. The vehicle direction is represented by an angle that the longitudinal axis of the vehicle 10 forms with respect to a reference direction. For example, in the case where the reference direction is the "north" and the clockwise direction is the positive direction, the vehicle direction in the case where the vehicle 10 faces toward the west is "270°." When the vehicle speed is low, a change in the position of the vehicle 10 over time is small, and therefore, the change in the position of the vehicle 10 over time cannot be detected accurately in some cases. When the vehicle 10 is turning, since the heading direction of the vehicle 10 changes with time, the vehicle direction cannot be determined as one direction in some cases. In view of this, the vehicle control ECU 101 may be configured to infer the vehicle direction on the basis of a change over time in the position of the vehicle 10 measured by the GNSS apparatus 126 only in the case where the vehicle speed is equal to or higher than a predetermined threshold speed (for example, 10 km/h) and the absolute value of the steering angle is equal to or less than a predetermined threshold value (for example, 10°.

An HMI (human machine interface) 127 is disposed at a position where the driver of the vehicle 10 can view and operate the HMI 127. The HMI 127 includes a touch panel display which can display images and which accepts touch operations. The vehicle control ECU 101 can display various types of images on the touch panel display of the HMI 127 and can detect operations performed on the touch panel display.

A vehicle speed sensor 128 can detect vehicle speed. A travel distance sensor 129 can detects the travel distance of the vehicle 10. The vehicle control ECU 101 can obtain the vehicle speed detected by the vehicle speed sensor 128 and the travel distance of the vehicle 10 detected by the travel distance sensor 129. The vehicle control ECU 101 accumulatively stores a piece of information representing the travel history of the vehicle 10 (hereinafter referred to as "travel history information") by obtaining the travel distance of the vehicle 10 from the travel distance sensor 129 and obtaining the steering angle from the steering angle sensor 122. The travel history information is a piece of information regarding a travel route from a predetermined point. The travel history information contains, for example, a travel distance from the predetermined point and the history or record of changes in the travel direction of the vehicle 10.

<Outline of Operation of the Present Apparatus 100>

The present apparatus 100 is configured to execute parking assist control. The parking assist control sets a target parking area TA in a parking lot PS and parks the vehicle 10 in the target parking area TA without requiring operation of the accelerator pedal, operation of the brake pedal, and operation of the steering wheel by the driver. Notably, the "target parking area TA" is an area which is located in the parking lot PS, in which the vehicle 10 fits, and which has a shape and dimensions approximately the same as the shape and dimensions of the vehicle 10 as viewed from above. Furthermore, the present apparatus 100 is configured to allow registration of a piece of information regarding the parking lot PS. Hereinafter, the piece of information regarding the parking lot PS will be referred to as "parking lot information." The details of the parking lot information will be described later. For convenience of explanation, a parking lot for which the parking lot information has not yet been registered may be referred to as an "unregistered parking lot PS," and a parking lot for which the parking lot information has already been registered may be referred to as a "registered parking lot PS."

Figure 2:
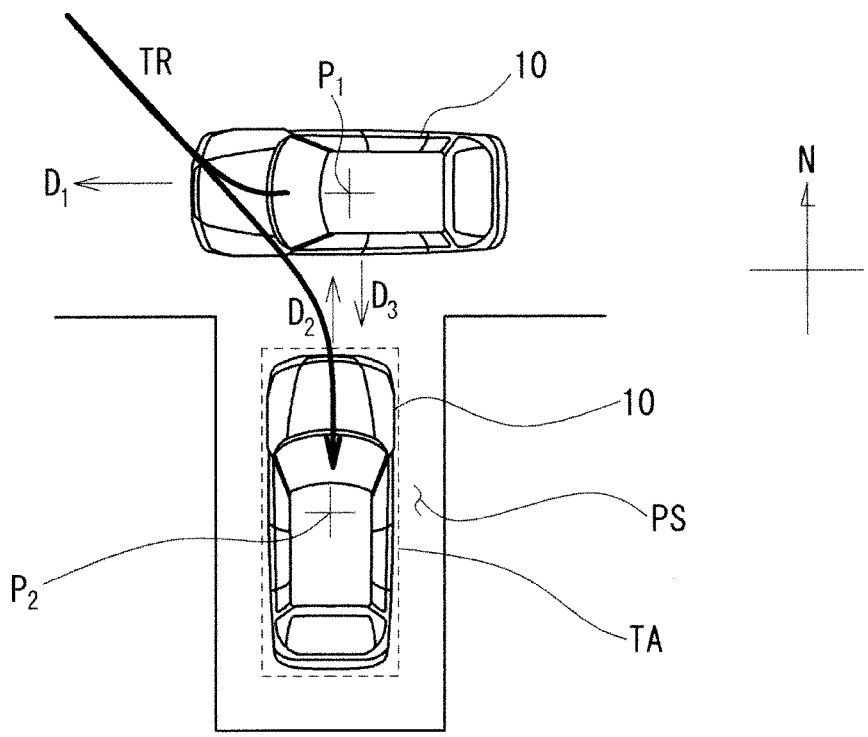
FIG. 2 is a view showing the positional relationship between a vehicle and a parking lot.

Here, there will be described an example parking assist control for automatically parking the vehicle 10 which has been temporarily stopped by the driver at an entrance of a parking lot PS or the vicinity thereof as shown in FIG. 2 so as to park the vehicle 10 in the parking lot PS; specifically, moving the vehicle 10 forward from the temporarily stopped position and then moving the vehicle 10 backward so as to park the vehicle 10 in the parking lot PS in a state in which the direction of the vehicle 10 has been changed by 90°. FIG. 2 is a view showing the positional relationship between the vehicle 10 and the parking lot PS. More specifically, FIG. 2 is a top view showing a state in which the driver has temporarily stopped the vehicle 10 at the entrance of the parking lot PS or the vicinity thereof so as to park the vehicle 10 in the parking lot PS (namely, a state in which the vehicle 10 has reached the entrance of the parking lot PS or the vicinity thereof) and a state in which parking of the vehicle 10 into the parking lot PS has been completed. As shown in FIG. 2, in order to park the vehicle 10 in an unregistered parking lot PS and register the parking lot information of the unregistered parking lot PS, the driver temporarily stops the vehicle 10 at the entrance of the unregistered parking lot PS or the vicinity thereof. The position where the driver has temporarily stopped the vehicle 10 will be referred to as a "first position $P_1$," and the vehicle direction at that time will be referred to as a "first direction $D_1$." The position of the vehicle 10 at a point in time when the parking of the vehicle 10 into the unregistered parking lot PS has been completed and the parking lot information of the unregistered parking lot PS has been registered (in other words, after that parking lot PS has changed from an "unregistered parking lot PS" to a "registered parking lot PS") will be referred to as a "second position $P_2$," and the vehicle direction at that time will be referred to as a "second direction $D_2$."

The parking lot information which is registered in the present apparatus 100 contains at least the first position $P_1$, the first direction $D_1$, a change in the vehicle direction occurring as a result of movement from the first position $P_1$ to the second position $P_2$ (i.e., parking completion position) (in other words, the relationship between the first direction $D_1$ and the second direction $D_2$), and a direction (hereinafter referred to as a "third direction $D_3$") in which the parking lot PS is present as viewed from the vehicle 10 when the vehicle 10 is located at the first position $P_1$ and the vehicle direction is the first direction $D_1$. The vehicle control ECU 101 can obtain "the change in the vehicle direction occurring as a result of movement of the vehicle 10 from the first position $P_1$ to the second position $P_2$" and the third direction $D_3$ on the basis of the travel history of the vehicle 10 during a period in which the vehicle 10 moves from the first position $P_1$ to the second position $P_2$. Notably, the parking lot information to be registered may contain the second direction $D_2$ instead of "the change in the vehicle direction occurring as a result of movement from the first position $P_1$ to the second position $P_2$." In the present embodiment, the third direction $D_3$ is represented by "right" or "left." In the example shown in FIG. 2, the first direction $D_1$ is the west (270° when represented by angle determined with the "north" being used as a reference and the clockwise direction being the positive direction for angle), and the third direction $D_3$ is "left."

(Operation for Parking the Vehicle 10 in an Unregistered Parking Lot PS and Registering the Parking Lot Information of the Unregistered Parking Lot PS)

When the speed of the vehicle 10 becomes equal to or lower than a threshold speed while traveling, the vehicle control ECU 101 determines that a precondition for starting extraction of characteristic points present in the rounding region of the vehicle 10 is satisfied. In the case where the parking lot information has not yet been registered in the present apparatus 100, during a period during which the precondition is satisfied (namely, the vehicle speed is equal to or lower than the threshold speed), the vehicle control ECU 101 causes the image recognition ECU 102 to extract characteristic points present in predetermined areas which are portions of the surrounding region of the vehicle 10 and are located on the left and right sides of the vehicle 10. Subsequently, the image recognition ECU 102 executes a process for extracting characteristic points for predetermined portions of the surrounding image data, which portions correspond to the left and right sides of the vehicle 10.

The vehicle control ECU 101 displays a setting image on the HMI 127 when the vehicle control ECU 101 detects an operation of the parking assist switch 112 in a period after extraction of characteristic points during which the vehicle 10 is in a stepped state. The setting image contains a plan view image, a target parking area image, a movement button image, and a determination button image. A registration button image is further contained in the setting image which is displayed in the case where an unregistered parking lot PS is present (in other words, no registered parking lot PS is present) in the surrounding region of the vehicle 10. The plan view image is an image obtained by viewing, from the vertically upper side, a scene which includes the vehicle 10 and an area located around the vehicle 10 and including the parking lot PS. The plan view image is generated by the image recognition ECU 102. The target parking area image is a rectangular frame-shaped image which represents the target parking area TA and is displayed in a state in which it is superimposed on the plan view image. The movement button image is an image which is operated by the user so as to move the target parking area image. When the vehicle control ECU 101 detects a touch operation performed on the movement button image, the vehicle control ECU 101 moves the target parking area image on the plan view image in accordance with the touch operation.

The determination button image is an image which is operated by the user so as to set (determinatively stores) the position of the target parking area image as the target parking area TA. When the vehicle control ECU 101 detects a touch operation performed on the determination button image while the setting image is being displayed, the vehicle control ECU 101 determinatively stores the position and orientation of the target parking area image superimposed on the parking lot PS in the plan view image as the position and orientation of the target parking area TA in the actual parking lot PS. After having determinatively stored the position and orientation of the target parking area TA, the vehicle control ECU 101 sets a target travel route TR along which the vehicle 10 is caused to travel so as to park the vehicle 10 in the target parking area TA. The registration button image is an image which is operated by the user so as to register the parking lot information in the present apparatus 100. When the vehicle control ECU 101 detects a touch operation performed on the registration button image, the vehicle control ECU 101 registers the parking lot information of the parking lot PS (unregistered parking lot PS) recognized by the image recognition ECU 102.

Furthermore, when a touch operation performed on the determination button image is detected, the image recognition ECU 102 obtains one or more extracted characteristic points as one or more characteristic points present on a ground surface at the entrance of the parking lot PS or in the vicinity thereof (hereinafter referred to as the "entrance characteristic point"). Notably, in the case where the parking lot PS is present on the left side of the vehicle 10 as shown in FIG. 2, the ground surface at the entrance of the parking lot PS or in the vicinity thereof means a grand surface including a predetermined region which is located on the left side of the vehicle 10 and contains a partial region of the parking lot PS located on a side close to the vehicle 10. When the entrance characteristic point is obtained, the vehicle control ECU 101 stores the coordinates of the obtained entrance characteristic point in a provisional coordinate system in the RAM as provisional entrance coordinates. Furthermore, the vehicle control ECU 101 stores the grayscale information of a characteristic area corresponding to the entrance characteristic point obtained by the image recognition ECU 102 in the RAM as provisional entrance grayscale information. Notably, the provisional coordinate system is a coordinate system whose origin is located at a predetermined position within the target parking area TA.

The vehicle control ECU 101 obtains from the GNSS apparatus 126 the position of the vehicle 10 in a period during which the vehicle 10 is in a stopped state (hereinafter referred to as the position of the stopped vehicle 10) and infers the vehicle direction in the period during which the vehicle 10 is in the stopped state (hereinafter referred to as the vehicle direction of the stopped vehicle 10). Subsequently, the vehicle control ECU 101 stores the obtained position of the vehicle 10 and the inferred vehicle direction in the RAM. Notably, depending on the reception condition of radio waves from the positioning satellites, the GNSS apparatus 126 may fail to obtain the position of the stopped vehicle 10 or the position of the vehicle 10 immediately before the vehicle 10 is stopped. Similarly, the vehicle control ECU 101 may fail to infer the vehicle direction of the stopped vehicle 10. In the case where the vehicle control ECU 101 has failed to obtain the position of the vehicle 10 from the GNSS apparatus 126, the vehicle control ECU 101 determines that the position of the vehicle 10 is "unknown." Similarly, in the case where the vehicle control ECU 101 has failed to infer the vehicle direction, the vehicle control ECU 101 determines that the vehicle direction is "unknown."

After completion of the determination of the target parking area TA, the determination of the target travel route TR, obtainment of the entrance characteristic point of the parking lot PS and storage of the entrance characteristic point into the RAM, and storage of the position and vehicle direction of the stopped vehicle 10 into the RAM, the vehicle control ECU 101 displays a parking start button image on the HMI 127. When the vehicle control ECU 101 detects a touch operation performed on the parking start button image, the vehicle control ECU 101 starts a parking travel process. The parking travel process is a process for causing the vehicle 10 to travel to the target parking area TA along the set target travel route TR, on the basis of information regarding a three-dimensional object(s) which is present around the vehicle 10 and is detected by the sonar sensors 111, surrounding images captured by the cameras 113, 114, 115, and 116, the vehicle speed obtained from the vehicle speed sensor 128, etc. In the case where the parking lot PS is present on the left side of the vehicle 10 as shown in FIG. 2, in the started parking travel process, the vehicle control ECU 101 first causes the vehicle 10 to turn right while moving forward and then causes the vehicle 10 to turn left while moving backward. In a period during which the parking travel process is being executed and the vehicle 10 is moving backward, the image recognition ECU 102 obtains, as intermediate characteristic points, a plurality of characteristic points which are present behind the vehicle 10. Subsequently, the vehicle control ECU 101 stores coordinates of the obtained intermediate characteristic points in the provisional coordinate system in the RAM as provisional intermediate coordinates and stores the grayscale information of each of characteristic areas corresponding to the obtained intermediate characteristic points in the RAM as provisional intermediate grayscale information.

When the moving direction of the vehicle 10 becomes straight while the vehicle 10 is moving backward, the image recognition ECU 102 obtains a characteristic point(s) present behind the vehicle 10 as at least one backward characteristic point. Notably, the image recognition ECU 102 may obtain a backward characteristic point(s) when the moving direction of the vehicle 10 becomes straight while the vehicle 10 is moving backward and when the vehicle 10 moves backward over a predetermined distance after that. In addition to the backward characteristic point(s), the vehicle control ECU 101 may obtain at least one of a forward characteristic point(s), a left-side characteristic point(s), and a right-side characteristic point(s).

Subsequently, the vehicle control ECU 101 stores the coordinates of the obtained intermediate characteristic points in the provisional coordinate system in the RAM as provisional intermediate coordinates and stores the grayscale information of each of characteristic areas corresponding to the obtained intermediate characteristic points in the RAM as the provisional intermediate grayscale information.

After the entirety of the vehicle 10 has been fitted into the target parking area TA, the vehicle control ECU 101 stops the vehicle 10 and ends the parking travel process. As a result, the parking of the vehicle 10 into the parking lot PS is completed. At that time, the image recognition ECU 102 obtains a forward characteristic point(s), a left-side characteristic point(s), and a right-side characteristic point(s). In addition to these characteristic points, the image recognition ECU 102 may obtain a backward characteristic point(s).

Subsequently, the image recognition ECU 102 obtains, as final characteristic points, at least one forward characteristic point present in each of forward divisional areas (a plurality of areas obtained by dividing a region in front of the vehicle 10 into a plurality of pieces), at least one left-side characteristic point present in each of left-side divisional areas (a plurality of areas obtained by dividing a region on the left side of the vehicle 10 into a plurality of pieces), and at least one right-side characteristic point present in each of right-side divisional areas (a plurality of areas obtained by dividing a region on the right side of the vehicle 10 into a plurality of pieces). At that time, in the case where backward characteristic points have been obtained, the image recognition ECU 102 may obtain, as a final characteristic point, at least one backward characteristic point present in each of backward divisional areas (a plurality of areas obtained by dividing a region behind the vehicle 10 into a plurality of pieces) in addition to the above-described characteristic points.

The vehicle control ECU 101 obtains and registers the coordinates of the obtained final characteristic points in a registration coordinate system as registration coordinates. Also, the vehicle control ECU 101 obtains and registers the grayscale information of each of characteristic areas corresponding to the obtained final characteristic points as registration grayscale information. The registration coordinate system is a coordinate system whose origin is located at the center position (in the vehicle width direction) of a shaft which connects the left rear wheel and the right rear wheel of the vehicle 10 in a state in which the parking of the vehicle 10 into the target parking area TA has been completed. Notably, the registration coordinates and the registration grayscale information are contained in the parking lot information.

Furthermore, the vehicle control ECU 101 converts the coordinates of the entrance characteristic point in the provisional coordinate system (provisional entrance coordinates) to coordinates in the registration coordinate system and registers the coordinates of the entrance characteristic point in the registration coordinate system and the grayscale information (registration entrance grayscale information) as the parking lot information of the parking lot PS including the target parking area TA. Similarly, the vehicle control ECU 101 converts the coordinates of the intermediate characteristic points in the provisional coordinate system to coordinates in the registration coordinate system and registers the coordinates of the intermediate characteristic points in the registration coordinate system and the grayscale information as the parking lot information of the parking lot PS (unregistered parking lot PS) including the target parking area TA. Furthermore, in addition to the above-described information, the vehicle control ECU 101 registers, as the first position $P_1$, the position of the vehicle 10 stored in the RAM (the position at which the vehicle 10 has stopped after having reached the entrance of the parking lot PS or the vicinity thereof), and registers, as the first direction $D_1$, the vehicle direction stored in the RAM (the vehicle direction at the time when the vehicle has reached the first position). Notably, the first position $P_1$ can be said as the position of the vehicle 10 at a point in time which is after the vehicle 10 has stopped and when an operation performed on the parking assist switch 112 is detected.

Notably, in the case where the position of the vehicle 10 having reached the entrance of the parking lot PS or the vicinity thereof is unknown (in the case where the position of the vehicle 10 could not be obtained), the vehicle control ECU 101 resisters the first position $P_1$ as "unknown." Namely, the vehicle control ECU 101 does not register a specific position of the first position $P_1$. Similarly, in the case where the vehicle direction could not be inferred, the vehicle control ECU 101 registers the first direction $D_1$ as "unknown." Namely, the vehicle control ECU 101 does not register a specific direction of the first direction $D_1$. In the case where at least one of the first position $P_1$ and the first direction $D_1$ is "unknown," the vehicle control ECU 101 turns on a flag indicating that (hereinafter referred to as the "unknown flag"). Notably, even in the case where the ignition switch 125 is turned off after this unknown flag has been turned on, the unknown flag is maintained in the on state. Meanwhile, when the vehicle 10 moves in a period during which the unknown flag is in the on state, the vehicle control ECU 101 changes the state of the unknown flag from "on" to "off."

(Operation for Parking the Vehicle in the Parking Lot without Registering Parking Lot Information)

In the case where the vehicle control ECU 101 detects a touch operation performed on the parking start button image without detecting a touch operation performed on the registration button image, the vehicle control ECU 101 does not register the parking lot information. The operation in this case is identical with the above-described "operation for parking the vehicle 10 in an unregistered parking lot PS and registering the parking lot information of the unregistered parking lot PS" except for the point that extraction of characteristic points is not performed during the backward movement of the vehicle 10 and after arrival at the target parking area TA and the point that the parking lot information is not registered.

(Searching of Registered Parking Lot)

In the case where the parking lot information has been registered in the present apparatus 100, during a period during which the precondition is satisfied, the vehicle control ECU 101 executes any one of the following processes (1) through (4) in accordance with the result of the determination as to whether or not the position of the vehicle 10 could be obtained and the result of the determination as to whether or not the vehicle direction could be inferred. This selective execution of the following processes (1) through (4) is performed in consideration of the fact that the vehicle control ECU 101 may fail to obtain at least one of the position of the vehicle 10 and the vehicle direction, depending on the radio wave reception condition of the GNSS apparatus 126. The vehicle control ECU 101 executes different processes depending on whether or not the position of the vehicle 10 could be measured and whether or not the vehicle direction could be inferred.

(1) The Case where the Position of the Vehicle 10 could be Measured and the Vehicle Direction could be Inferred The vehicle control ECU 101 determines whether or not the distance between the vehicle 10 and the entrance of the registered parking lot PS is equal to or shorter than a threshold distance. Specifically, the vehicle control ECU 101 computes the distance between the vehicle 10 and the entrance of the registered parking lot PS on the basis of the position of the vehicle 10 obtained from the GNSS apparatus 126 and the first position $P_1$ registered as part of the parking lot information. Subsequently, the vehicle control ECU 101 determines whether or not the computed distance is equal to or shorter than the threshold distance.

Figure 3:
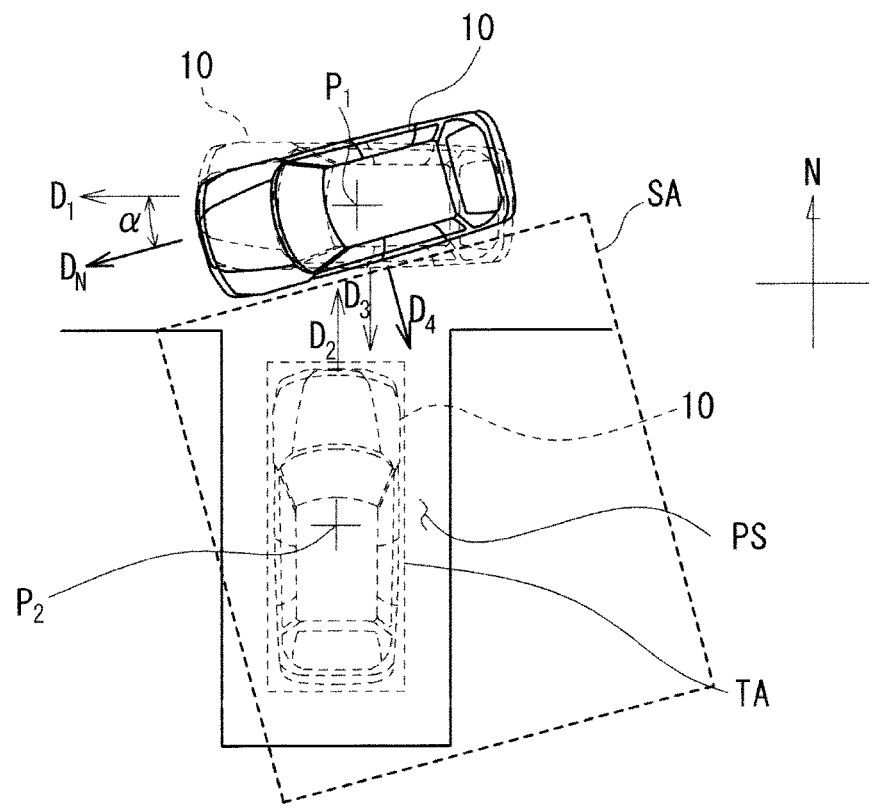
FIG. 3 is a top view showing a direction in which a registered parking lot is present in relation to the vehicle.

FIG. 3 is a top view showing a direction in which the registered parking lot PS is present in relation to the vehicle 10. The vehicle control ECU 101 infers the direction in which the registered parking lot PS is present in relation to the vehicle 10 on the basis of the vehicle direction and the registered parking lot information. Notably, the "direction in which the registered parking lot PS is present" inferred here is not the direction in which the registered parking lot PS is present and which is determined with the present position of the vehicle 10 used as a reference (viewed from the present position of the vehicle 10) and is the direction in which the registered parking lot PS is present in relation to the vehicle 10 in the case where the vehicle 10 has reached the entrance of the registered parking lot PS or the vicinity thereof while maintaining the present vehicle direction $D_N$ (namely in the case where the vehicle 10 has reached the first position $P_1$). This "direction in which the registered parking lot PS is present" is represented by "right" or "left." In the following description, the "direction in which the registered parking lot PS is present" inferred here will be referred to as the "fourth direction $D_4$."

The vehicle control ECU 101 infers the fourth direction $D_4$ on the basis of the vehicle direction $D_N$, the first direction $D_1$, and the third direction $D_3$. Notably, as shown in FIG. 3, the vehicle direction $D_N$ may incline in relation to the first direction $D_1$. Therefore, in the example shown in FIG. 3, the actual "direction in which the registered parking lot PS is present" is "left front." However, in this case, the vehicle control ECU 101 infers the fourth direction $D_4$ as "left." Specifically, when the absolute value of an angle $\alpha$ formed between the vehicle direction $D_N$ and the first direction $D_1$ is less than 90°, the vehicle control ECU 101 infers that the fourth direction $D_4$ is the same as the third direction $D_3$. Meanwhile, when the absolute value of the angle $\alpha$ formed between the vehicle direction $D_N$ and the first direction $D_1$ is greater than 90°, the vehicle control ECU 101 infers that the fourth direction $D_4$ is a direction opposite the third direction $D_3$.

In the case where the vehicle 10 is traveling and the distance between the position of the vehicle 10 and the entrance of the registered parking lot PS is equal to or shorter than the threshold distance, the vehicle control ECU 101 causes the image recognition ECU 102 to extract characteristic points only from an area SA located on the side in the fourth direction $D_4$ without extracting characteristic points from an area located on the opposite side (namely, in the direction in which presence of the registered parking lot PS is not inferred). In the case of the example shown in FIG. 3, the image recognition ECU 102 performs the extraction of characteristic points for the area SA which is a portion of the surrounding region and is located on the left side of the vehicle 10 and does not perform the extraction of characteristic points for the area which is a portion of the surrounding region and is located on the right side of the vehicle 10.

(2) The Case where the Position of the Vehicle 10 could be Obtained but the Vehicle Direction $D_N$ could not be Inferred In this case, the vehicle control ECU 101 cannot determine whether the registered parking lot PS is present on the left side or the right side of the vehicle 10. In view of this, in the case where the vehicle speed is equal to or lower than a predetermined threshold speed and the distance between the vehicle 10 and the entrance of the registered parking lot PS is equal to or shorter than the threshold distance, the vehicle control ECU 101 causes the image recognition ECU 102 to extract characteristic points present on both the left and right sides of the vehicle 10. Namely, the image recognition ECU 102 performs extraction of characteristic points for the area which is a portion of the surrounding region and is located on the right side of the vehicle 10 and for the area which is a portion of the surrounding region and is located on the left side of the vehicle 10.

(3) The Case where the Vehicle Direction $D_N$ could be Inferred but the Position of the Vehicle 10 could not be Measured In this case, the determination as to whether the registered parking lot PS is present on the left side or the right side of the vehicle 10 can be made but the distance between the vehicle 10 and the entrance of the registered parking lot PS cannot be measured. In view of this, the vehicle control ECU 101 infers the fourth direction $D_4$ on the basis of the vehicle direction $D_N$ and the registered first direction $D_1$. Subsequently, during a period during which the precondition is satisfied, the vehicle control ECU 101 causes the image recognition ECU 102 to extract characteristic points only from the area SA located on the side in the fourth direction $D_4$ without extracting characteristic points from the area located on the opposite side (namely, in the direction in which presence of the parking lot is not inferred).

(4) The Case where the Position of the Vehicle 10 could not be Obtained and the Vehicle Direction $D_N$ could not be Inferred In this case, the vehicle control ECU 101 cannot measure the distance between the vehicle 10 and the entrance of the registered parking lot PS. Furthermore, the vehicle control ECU 101 cannot determine, through inference, whether the registered parking lot PS is located on the left side or the right side of the vehicle 10. Accordingly, in this case, during a period during which the precondition is satisfied, the vehicle control ECU 101 causes the image recognition ECU 102 to perform extraction of characteristic points for the area which is a portion of the surrounding region and is located on the right side of the vehicle 10 and for the area which is a portion of the surrounding region and is located on the left side of the vehicle 10.

When the vehicle 10 stops after that, the vehicle control ECU 101 compares pieces of grayscale information of the obtained characteristic points and the grayscale information of the registered entrance characteristic point. The vehicle control ECU 101 determines whether or not the pieces of grayscale information of the obtained characteristic points contain a piece of grayscale information which is coincident or approximately coincident with the grayscale information of the registered entrance characteristic point. In the case where a piece of grayscale information coincident or approximately coincident with the grayscale information of the registered entrance characteristic point is present, the vehicle control ECU 101 determines that the vehicle 10 has reached the entrance of the registered parking lot PS or the vicinity thereof. Namely, the vehicle control ECU 101 determines that the registered parking lot PS is present on the right side or the left side of the vehicle 10. Meanwhile, in the case where a piece of grayscale information coincident or approximately coincident with the grayscale information of the registered entrance characteristic point is not present, the vehicle control ECU 101 determines that the vehicle 10 has not yet reached the entrance of the registered parking lot PS or the vicinity thereof. Namely, the vehicle control ECU 101 determines that the registered parking lot PS is not present.

Such control can reduce the processing load of the image recognition ECU 102. Namely, during a period during which the position of the vehicle 10 can be obtained, the image recognition ECU 102 does not execute the process for obtaining characteristic points present around the vehicle 10 if the distance between the vehicle 10 and the entrance of the registered parking lot PS is longer than a predetermined threshold distance. According, the processing amount of the image recognition ECU 102 can be reduced, whereby the processing load of the image recognition ECU 102 can be reduced. Furthermore, in the case where the fourth direction $D_4$ could be inferred, the image recognition ECU 102 executes the process of extracting characteristic points only for the area located on the side in the fourth direction $D_4$. Accordingly, it is possible to reduce the processing amount as compared with a process for extracting characteristic points present in areas located on the both sides (left and right sides) of the vehicle 10. In this case, it is possible to increase the processing capability allotted to the process for extracting characteristic points present in the area located on the side where the registered parking lot PS is present.

Furthermore, the operation as described above can prevent or restrain erroneous recognition of the registered parking lot PS. Namely, the accuracy of extraction of characteristic points may be influenced by the sunlight condition and the meteorological condition. Therefore, in order to allow recognition of the registered parking lot PS even when at least one of the sunlight condition and the meteorological condition changes, the vehicle control ECU 101 may be configured to determine that the registered parking lot PS is present even when the obtained characteristic point information is not completely coincident with the registered characteristic point information but is similar to the registered characteristic point information. Therefore, the vehicle control ECU 101 may erroneously recognize, as the registered parking lot PS, another parking lot which differs from the registered parking lot PS but whose characteristic point information is similar to that of the registered parking lot PS. By virtue of the above-described process, the image recognition ECU 102 does not perform extraction of characteristic points in the case where the distance between the vehicle 10 and the entrance of the registered parking lot PS is longer than the threshold distance. Therefore, it is possible to prevent erroneous recognition of a different parking lot located away from the registered parking lot PS as the registered parking lot PS.

(Operation in the Case where at Least One of the First Position $P_1$ and the First Direction $D_1$ is "Unknown")

In the case where at least one of the first position $P_1$ and the first direction $D_1$ is "unknown" (namely, at least one of a specific position of the first position $P_1$ and a specific direction of the first direction $D_1$ has not been registered), the vehicle control ECU 101 execute operations which will be described below. As a result, the vehicle control ECU 101 executes registration of the specific position (longitude and latitude) of the first position $P_1$ and registration of the specific direction of the first direction $D_1$.

When the ignition switch 125 is turned on, the vehicle control ECU 101 determines whether or not the vehicle 10 has not moved after completion of the operation of registering the parking lot information. Specifically, when the ignition switch 125 is turned on, the vehicle control ECU 101 determined whether or not the unknown flag is in the on state. In the case where the unknown flag is in the on state, the vehicle control ECU 101 determines that the vehicle 10 has not yet moved after completion of the operation of registering the parking lot information.

When the ignition switch 125 is turned on, the vehicle control ECU 101 sets a coordinate system whose reference point (the origin of coordinates) is located at a position where the vehicle 10 is present when the ignition switch 125 is turned on. Notably, in the case where the first position $P_1$ is "unknown," the specific position (longitude and latitude) of the reference point is unknown. When the vehicle 10 starts to move, the vehicle control ECU 101 accumulatively stores the travel history information.

During a period during which the vehicle 10 is traveling, the vehicle control ECU 101 infers the vehicle direction after it becomes possible to obtain the position of the vehicle 10 from the GNSS apparatus 126. Subsequently, the vehicle control ECU 101 back-calculates the position (longitude and latitude) of the reference point by using the obtained position of the vehicle 10 and the travel history information. Since the vehicle control ECU 101 continuously obtains the travel distance from the reference point and a change in the vehicle direction from the reference point, the vehicle control ECU 101 can calculate backward the position of the reference point when the position of the vehicle 10 becomes clear. Subsequently, the vehicle control ECU 101 registers the position of the reference point determined through the back-calculation, as the first position $P_1$ of the parking lot information of the registered parking lot PS. Notably, although, strictly speaking, the position of the reference point is the second position $P_2$, since the first position $P_1$ is close to the second position $P_2$, no problem occurs even when the position of the reference point determined through the back-calculation is considered as the first position $P_1$.

Similarly, if the vehicle direction can be inferred, the vehicle control ECU 101 can calculate backward the vehicle direction at the reference point (namely, the second direction $D_2$). Subsequently, the vehicle control ECU 101 infers the first direction $D_1$ on the basis of the "vehicle direction at the reference point" inferred through the back-calculation and the registered "relationship between the first direction $D_1$ and the second direction $D_2$." The vehicle control ECU 101 then registers the inferred first direction $D_1$ as the first direction $D_1$ of the parking lot PS. Namely, the vehicle control ECU 101 changes the first direction $D_1$ from "unknown" to the "vehicle direction inferred through the back-calculation."

By virtue of the operation as described above, even in the case where at least one of the specific position of the first position $P_1$ and the specific direction of the first direction $D_1$ cannot be registered when the vehicle 10 is parked in the unregistered parking lot PS, the specific position and/or the specific direction can be registered after that. Thus, after registration of the specific position and/or the specific direction, as described above, it is possible to prevent or restrain erroneous recognition of the registered parking lot and to reduce the processing load of the image recognition ECU 102.

Notably, in some case, after the ignition switch 125 has been turned on, the ignition switch 125 is turned off in a state in which the vehicle control ECU 101 has not yet obtained (could not obtain) the position of the vehicle 10 from the GNSS apparatus 126. In this case, when the vehicle 10 moves, the vehicle control ECU 101 maintains the state in which the first position $P_1$ in the parking lot information is "unknown." Similarly, in the case where, after the ignition switch 125 has been turned on, the ignition switch 125 is turned off in a state in which the vehicle control ECU 101 has not yet inferred (could not infer) the vehicle direction, the vehicle control ECU 101 maintains the state in which the first direction $D_1$ in the parking lot information is "unknown."

(Operation of Parking the Vehicle 10 in the Registered Parking Lot PS)

In the case where the vehicle control ECU 101 determines that the registered parking lot PS is present in the surrounding region of the vehicle 10, the vehicle control ECU 101 displays images, including a plan view image, a target parking area image, and a parking start button image, on the HMI 127. At that time, the plan view image is displayed in such a manner that the scene of the registered parking lot PS is contained in the plan view image. Furthermore, the vehicle control ECU 101 displays the target parking area image on the plan view image to be located at a "position where the vehicle 10 was actually parked when the parking lot information of that parking lot PS was registered." Subsequently, when the vehicle control ECU 101 detects a touch operation performed on the parking start button image, the vehicle control ECU 101 determinatively stores the position of the target parking area on the plan view image displayed on the HMI 127, as the target parking area TA in the actual parking lot. Subsequently, the vehicle control ECU 101 sets a target travel route TR along which the vehicle 10 is caused to travel so as to be parked in the target parking area TA. After that, the vehicle control ECU 101 performs the parking travel process.

Figure 4:
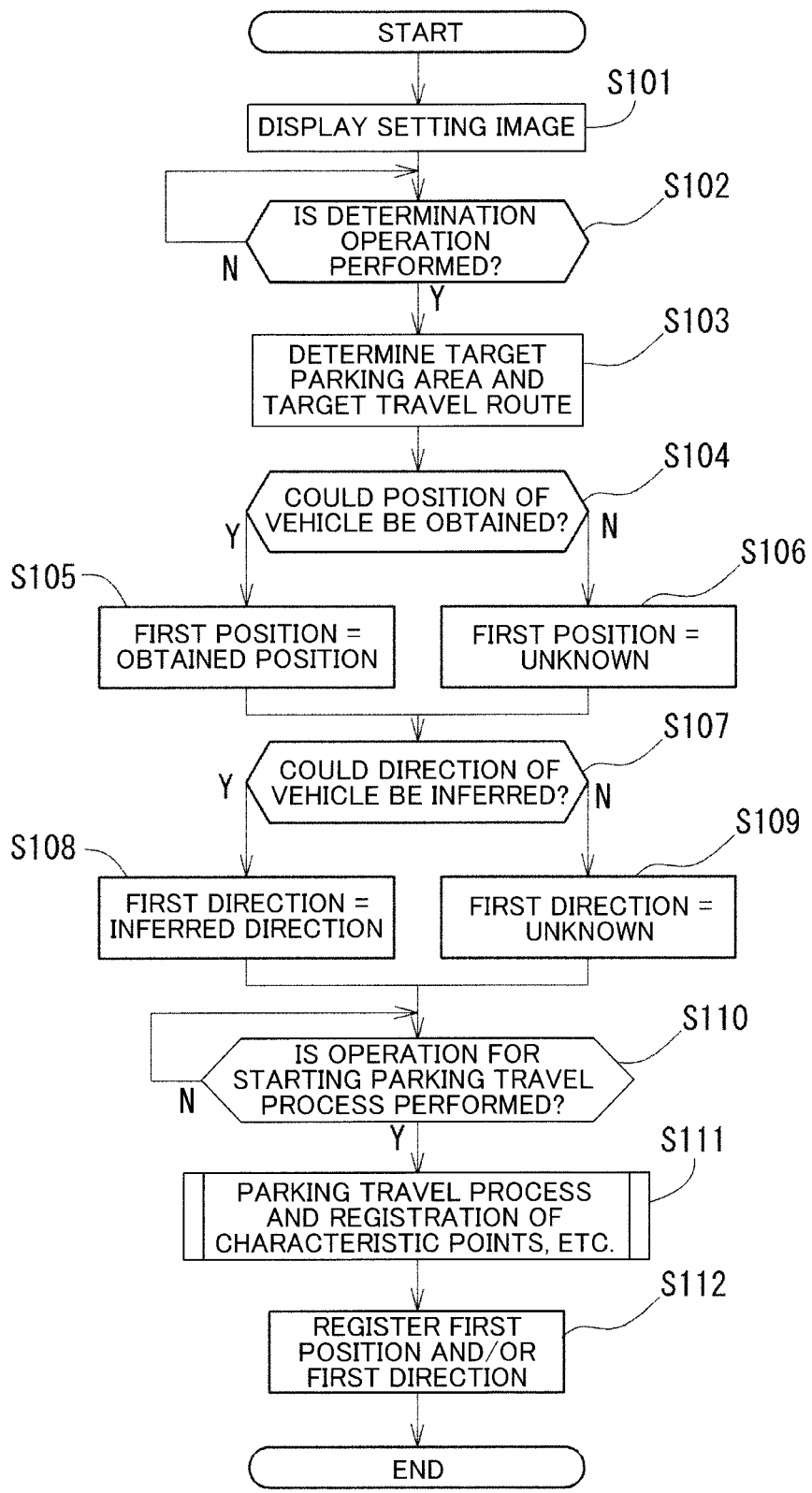
FIG. 4 is a flowchart showing a routine executed by a CPU.

Next, a routine executed by the CPU of the vehicle control ECU 101 will be described with reference to FIG. 4. When the CPU of the vehicle control ECU 101 detects an operation of the parking assist switch 112 in a state in which the vehicle 10 is stopped, the CPU executes the routine shown by a flowchart of FIG. 4. In the following description, unless otherwise specified, the "CPU" means the CPU of the vehicle control ECU 101. Notably, the image recognition ECU 102 extracts characteristic points present in the surrounding region of the vehicle 10 while the vehicle 10 is traveling. Therefore, before a point in time when the vehicle 10 stops, the characteristic points present in the surrounding region of the vehicle 10 have been extracted. Furthermore, the CPU repeatedly obtains the position of the vehicle 10 from the GNSS apparatus 126 and repeatedly infers the vehicle direction on the basis of the obtained position of the vehicle 10.

In step S101, the CPU displays the setting image on the HMI 127. Subsequently, upon detection of a touch operation performed on the movement button image in a period during which the setting image is displayed on the HMI 127, the CPU moves the target parking area image on the plan view image in accordance with the touch operation.

In step S102, the CPU determines whether or not an operation for determining the target parking area TA has been performed; specifically, determines whether or not a touch operation has been performed on the determination button image. The CPU waits in this step until a touch operation performed on the determination button image is detected. Upon detection of a touch operation performed on the determination button image, the CPU proceeds to step S103.

In step S103, the CPU determinatively stores, as the target parking area TA in the actual parking lot, the position of the target parking area on the plan view image at the time when the touch operation performed on the determination button image is detected. Subsequently, the CPU computes the target travel route TR of the vehicle 10 extending to the target parking area TA from the position where the vehicle 10 is currently present. In addition, upon detection of the touch operation performed on the determination button image, the CPU stores the information regarding the entrance characteristic point in the RAM as described above.

In step S104, the CPU determines whether or not the position at which the vehicle 10 has stopped (hereinafter referred to as the "stopped position of the vehicle 10") was able to be obtained from the GNSS apparatus 126. In the case where the stopped position of the vehicle 10 was able to be obtained from the GNSS apparatus 126, the CPU proceeds to step S105. In step S105, the CPU stores the position obtained from the GNSS apparatus 126 in the RAM, as the stopped position of the vehicle 10 (namely, the first position $P_1$). Meanwhile, in the case where the stopped position of the vehicle 10 was not able to be obtained from the GNSS apparatus 126, the CPU proceeds to step S106. In step S106, the CPU stores a piece of information indicating that the specific position of the first position $P_1$ is "unknown" in the RAM as the information of the first position $P_1$. Subsequently, the CPU proceeds to step S107.

In step S107, the CPU determines whether or not the vehicle direction was able to be inferred. In the case where the vehicle direction was able to be inferred, the CPU proceeds to step S108. In step S108, the CPU stores the inferred direction in the RAM as the inferred vehicle direction (namely, the first direction $D_1$). Meanwhile, in the case where the vehicle direction was not able to be inferred, the CPU proceeds to step S109. In step S109, the CPU stores a piece of information indicating that the specific direction of the first direction $D_1$ is "unknown" in the RAM as the information of the first direction $D_1$. Subsequently, the CPU proceeds to step S110.

In step S110, the CPU waits for a user's operation which instructs the start of the parking travel process. Specifically, the CPU displays the parking start button image on the HMI 127, and then determines whether or not a touch operation has been performed on the parking start button image. Upon detection of a touch operation performed on the parking start button image, the CPU proceeds to step S111. In the case where the CPU detects no touch operation, the CPU waits in this step.

In step S111, the CPU executes the parking travel process. Notably, as described above, the CPU causes the image recognition ECU 102 to perform extraction of predetermined characteristic points during a period during which the vehicle 10 is moved to the target parking area TA and after the vehicle 10 has reached the target parking area TA (after the vehicle 10 has stopped). Moreover, the CPU registers the information regarding the characteristic points as the parking lot information.

In step S112, the CPU registers, as parts of the parking lot information of this parking lot PS, the first position $P_1$ stored in the RAM in step S105 or S106 and the first direction $D_1$ stored in the RAM in step S108 or S109. Notably, in at least one of the case where the first position $P_1$ is registered as "unknown" and the case where the first direction $D_1$ is registered as "unknown," the CPU turns the "unknown flag" on.

Figure 5:
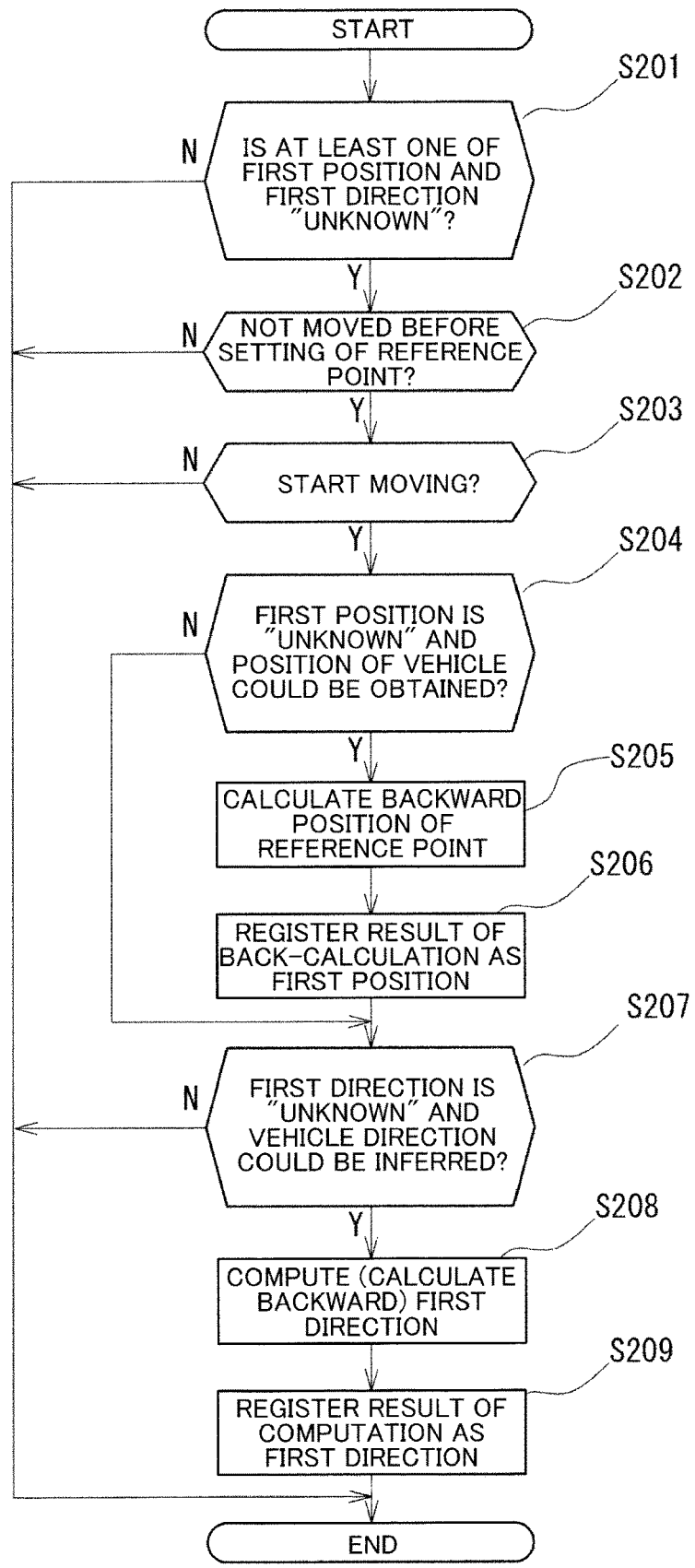
FIG. 5 is a flowchart showing another routine executed by the CPU.

Next, a routine which is executed when either or both of the first position $P_1$ and the first direction $D_1$ are "unknown" so as to register them will be described. FIG. 5 is a flowchart showing this routine. When the ignition switch 125 is turned on, the CPU sets a coordinate system whose origin (reference point) is located at a position where the vehicle 10 is present at the time when the ignition switch 125 is turned on. During a period during which the ignition switch 125 is maintained in the on state, the CPU continues accumulation of the travel history information of the vehicle 10 in the RAM. Notably, the CPU performs the setting of the coordinate system and the accumulation of the travel history information irrespective of whether or not either or both of the first position $P_1$ and the first direction $D_1$ are "unknown." The reference point and the travel history information are deleted (initialized) when the ignition switch 125 is turned off. When the ignition switch 125 is turned on, the CPU repeatedly executes the routine shown by the flowchart of FIG. 5 at predetermined intervals.

In step S201, the CPU determines whether or not at least one of the first position $P_1$ and the first direction $D_1$ of the registered parking lot information is "unknown." In the case where both of them are not "unknown," the CPU ends this routine. In the case where at least one of them is "unknown," the CPU proceeds to step S202.

In step S202, the CPU determines whether or not the vehicle 10 has moved in the period between the time when the parking lot information was registered and the time when the reference point is set. Specifically, the CPU determines whether or not the "unknown flag" was in the on state when the ignition switch 125 was turned on. In the case where the vehicle 10 did not moved in the period between the time when the parking lot information was registered and the time when the ignition switch 125 was turned on, namely, in the case where the unknown flag is in the on state, the possibility that the position of the reference point coincides with the position of the registered parking lot is high. In view of this, when the unknown flag is in the on state, the CPU proceeds to step S203. In the case where the vehicle 10 has moved after registration of the parking lot information, the position of the reference point does not coincide with the position of the registered parking lot (or the possibility that the position of the reference point does not coincide with the position of the registered parking lot is high). Therefore, although the position of the reference point can determined through back-calculation, the position of the registered parking lot cannot be inferred. Therefore, in this case, the CPU ends this routine.

In step S203, the CPU determines whether or not the vehicle 10 has started to move. In the case where the vehicle 10 has not yet started to move, the CPU ends the current execution of this routine. In the case where the vehicle 10 has started to move, the CPU proceeds to step S204.

In step S204, the CPU determines whether or not the first position $P_1$ is "unknown" and whether or not the position of the vehicle 10 was able to be obtained from the GNSS apparatus 126. In the case where the first position $P_1$ is "unknown" and the position of the vehicle 10 was able to be obtained from the GNSS apparatus 126, the CPU proceeds to step S205. In at least one of the case where the first position $P_1$ is not "unknown" and the case where the position of the vehicle 10 was not able to be obtained, the CPU proceeds step S207 by skipping steps S205 and S206.

In step S205, the CPU computes (back-calculates) the position of the reference point by using the obtained position of the vehicle 10 and the travel history information. In step S206, the CPU registers the position of the reference point obtained through computation in step S205, as the first position $P_1$ for that parking lot. In other words, the CPU changes the first position $P_1$ from "unknown" to the "position of the reference point obtained through computation."

In step S207, the CPU determines whether or not the first direction $D_1$ is "unknown" and whether or not the vehicle direction was able to be inferred. In the case where the first direction $D_1$ is "unknown" and the vehicle direction was able to be inferred, the CPU proceeds to step S208. In at least one of the case where the first direction $D_1$ is not "unknown" and the case where the vehicle direction was not able to be inferred, the CPU ends the current execution of this routine.

In step S208, the CPU back-calculates the vehicle direction at the time when the vehicle 10 was located at the reference point by using the inferred vehicle direction and the travel history information. Furthermore, the CPU computes the first direction $D_1$ from the computed "vehicle direction at the time when the vehicle 10 was located at the reference point" and the registered "relationship between the first direction $D_1$ and the second direction $D_2$." Subsequently, in step S209, the CPU registers the result of the computation in step S208 as the first direction $D_1$ for the registered parking lot. In other words, the CPU changes the first direction $D_1$ from "unknown" to the "direction obtained through computation."

Figure 6:
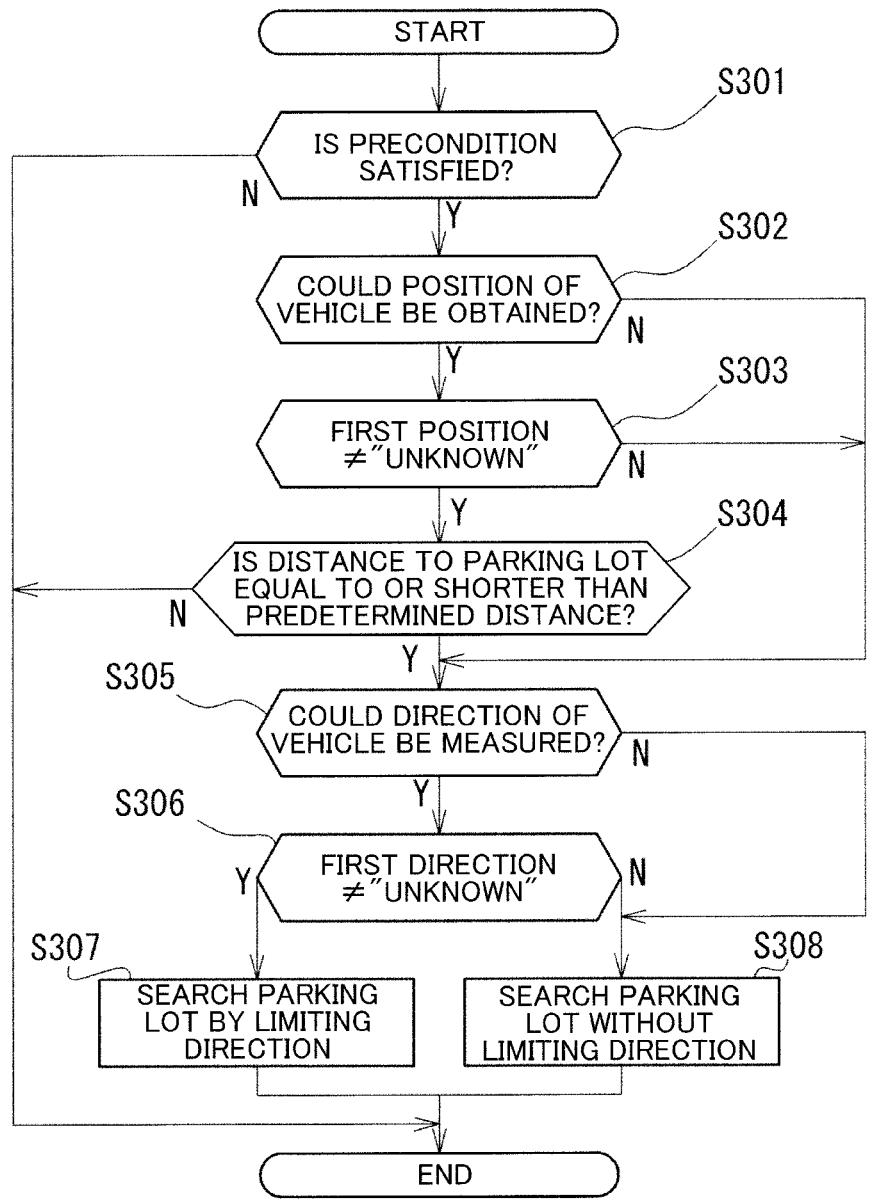
FIG. 6 is a flowchart showing still another routine executed by the CPU.

Next, control for searching the registered parking lot when its parking lot information has been registered in the present apparatus 100 will be described. FIG. 6 is a flowchart showing the routine which is executed by the CPU so as to search the registered parking lot. While the vehicle 10 is traveling, the CPU continuously executes the routine shown in FIG. 6 at predetermined intervals.

In step S301, the CPU determines whether or not the precondition for extraction of characteristic points is satisfied; specifically, whether or not the vehicle speed is equal to or lower than the threshold speed. In the case where the precondition is not satisfied; namely, in the case where the vehicle speed is higher than the threshold speed, the CPU ends this routine. In this case, the image recognition ECU 102 does not perform extraction of characteristic points. In the case where the precondition is satisfied; namely, in the case where the vehicle speed is equal to or lower than the threshold speed, the CPU proceeds to step S302.

In step S302, the CPU determines whether or not the position of the vehicle 10 was able to be obtained from the GNSS apparatus 126. In the case where the position of the vehicle 10 was able to be obtained, the CPU proceeds to step S303. In the case where the position of the vehicle 10 was not able to be obtained, the CPU proceeds to step S305 by skipping steps S303 and S304.

In step S303, the CPU determines whether or not the first position $P_1$ is not "unknown." In the case where the first position $P_1$ is unknown, the CPU proceeds to step S305 by skipping step S304. In the case where the first position $P_1$ is not unknown, the CPU proceeds to step S304. In step S304, the CPU determines whether or the distance between the position of the vehicle 10 and the entrance of the registered parking lot PS is equal to or shorter than the threshold distance. In the case where the distance is equal to or shorter than the threshold distance, the CPU proceeds to step S305. In the case where the distance is longer than the threshold distance, the CPU ends this routine. Namely, the image recognition ECU 102 does not perform extraction of characteristic points.

In step S305, the CPU determines whether or not the vehicle direction was able to be inferred. In the case where the vehicle direction was able to be inferred, the CPU proceeds to step S306. In the case where the vehicle direction was not able to be inferred, the CPU proceeds to step S308 by skipping step S306. In step S306, the CPU determines whether or not the first direction $D_1$ is not "unknown." In the case where the first direction $D_1$ is not unknown, the CPU proceeds to step S307. In the case where the first direction $D_1$ is unknown, the CPU proceeds to step S308.

In the case where the CPU has proceeded to step S307, the CPU infers the fourth direction $D_4$ on the basis of the inferred vehicle direction and the first direction $D_1$. Subsequently, the CPU causes the image recognition ECU 102 to perform extraction of characteristic points only in the inferred fourth direction $D_4$. Meanwhile, in the case where the CPU has proceeded to step S308, the CPU causes the image recognition ECU 102 to perform extraction of characteristic points without limiting the direction; namely for the areas on the both sides (left and right sides) of the vehicle 10.

According to this routine, in the case where the first position $P_1$ is not "unknown" ("Y" in S303), when the precondition is satisfied ("Y" in S301) and the distance between the vehicle 10 and the entrance of the registered parking lot PS becomes equal to or shorter than the threshold distance ("Y" in S304), the image recognition ECU 102 extracts characteristic points present in the surrounding region of the vehicle 10. In this case, when the direction of the vehicle 10 can be obtained ("Y" in S305) and the first direction $D_1$ is not "unknown" ("Y" in S306), the image recognition ECU 102 performs extraction of characteristic points only for the area located on the side in the inferred fourth direction $D_4$.

Meanwhile, in the case where the first position $P_1$ is "unknown" ("N" in S303), if the precondition is satisfied ("Y" in S301), the image recognition ECU 102 extracts characteristic points present in the surrounding region of the vehicle 10. Furthermore, in this case, when the vehicle direction can be obtained ("Y" in S305) and the first direction $D_1$ is not "unknown" ("Y" in S306), the image recognition ECU 102 performs extraction of characteristic points only for the area located on the side in the inferred fourth direction $D_4$. Meanwhile, when the direction of the vehicle 10 cannot be obtained ("N" in S305), the image recognition ECU 102 extracts characteristic points present on the both sides (left and right sides) of the vehicle 10. Even when the direction of the vehicle 10 is obtained ("Y" in S305), the image recognition ECU 102 extracts characteristic points present on the both sides (left and right sides) of the vehicle 10 if the first direction $D_1$ is unknown ("Y" in S306).

Notably, the present apparatus 100 may be configured to allow registration of the parking lot information of each of a plurality of parking lots PS. In this case, the vehicle control ECU 101 executes the above-described process for each of the registered parking lots PS. Namely, when the precondition is satisfied and the distance between the vehicle 10 and the entrance of a certain one of the registered parking lots PS becomes equal to or shorter than the threshold distance, the vehicle control ECU 101 causes the image recognition ECU 102 to perform extraction of characteristic points only for the side where presence of the certain parking lot PS is inferred. Notably, in some cases, the first positions $P_1$ of some parking lots PS among the plurality of parking lots PS may be registered as "unknown." In this cases, when the precondition is satisfied, the vehicle control ECU 101 may cause the image recognition ECU 102 to perform extraction of characteristic points irrespective of the distance between the vehicle 10 and the entrance of a registered parking lot PS whose first position $P_1$ is clear. By virtue of such control, of the plurality of registered parking lots PS, a registered parking lot(s) PS for which the first position $P_1$ has been registered as "unknown" can be searched. Meanwhile, the vehicle control ECU 101 may cause the image recognition ECU 102 to perform extraction of characteristic points when the precondition is satisfied and the distance between the vehicle 10 and the entrance of a registered parking lot PS which is one of the plurality of registered parking lots PS and whose first position $P_1$ is clear becomes equal to or shorter than the predetermined threshold distance. Such control can reduce the processing load of the image recognition ECU 102.

While the embodiment of the present invention has been described, the present invention is not limited to the above-described embodiment. Various modifications can be employed without departing from the scope of the invention.

In the above-described embodiment, the image recognition ECU 102 starts extraction of characteristic points when the vehicle speed is equal to or lower than the threshold speed and the distance between the vehicle 10 and the entrance of the registered parking lot PS (namely, the first position $P_1$) becomes equal to or shorter than the threshold distance. However, the present invention is not limited to such a configuration. For example, in the case where the position of the registered parking lot PS (namely, the second position $P_2$) is clear, the image recognition ECU 102 may start extraction of characteristic points when the vehicle speed is equal to or lower than the threshold speed and the distance between the vehicle 10 and the registered parking lot PS (namely, the second position $P_2$) becomes equal to or shorter than the threshold distance. Notably, unless the first position $P_1$ is unknown, the vehicle control ECU 101 can compute the second position $P_2$ on the basis of the travel history information from the first position $P_1$ to completion of parking.

In the above-described embodiment, the vehicle control ECU 101 infers the vehicle direction. However, the GNSS apparatus 126 may infer the vehicle direction. In the above-described embodiment, the vehicle control ECU 101 performs the comparison between the grayscale information of the new characteristic point and the grayscale information of the registered entrance characteristic point. However, the image recognition ECU 102 may perform this comparison.

In the above-described embodiment, the parking lot information which is registered in the present apparatus 100 contains at least the first position $P_1$, the first direction $D_1$, and the second direction $D_2$. However, this is not a limitation. The parking lot information which is registered in the present apparatus 100 may contain pieces of information from which the first position $P_1$, the first direction $D_1$, and the second direction $D_2$ can be inferred. For example, the parking lot information which is registered may contain the first position $P_1$, the first direction $D_1$, and the second position $P_2$. Alternatively, the parking lot information which is registered may contain the second position $P_2$, the vehicle direction at the second position $P_2$, and the "angle difference between the first direction $D_1$ (the vehicle direction at the time when a touch operation was performed on the parking start button image) and the second direction $D_2$."

In the above-described embodiment, the control for automatically parking the vehicle in the registered parking lot is shown as the parking assist control. However, the parking assist control is not limited to the above-described control. For example, the parking assist control may be control for instructing the driver to operate the steering wheel, the accelerator pedal, and the brake pedal in such a manner that the vehicle travels along the target travel route TR. Furthermore, the types of characteristic points obtained in the parking assist control and the method for obtaining characteristic points are not limited to those in the above-described embodiment. The information regarding characteristic points, which is registered as the parking lot information, is not limited to the information described in the embodiment. The information regarding characteristic points, which is registered as the parking lot information, may be any piece of information from which a parking lot can be recognized.

What is claimed is:

1. A parking assist apparatus comprising:
   an image processing apparatus which extracts at least one characteristic point contained in an image of a surrounding region of a vehicle, the image being captured by a camera, and which obtains a piece of information regarding the characteristic point;
   a positioning apparatus which measures a position of the vehicle; and
   a control apparatus configured to register a piece of information regarding at least one characteristic point contained in an image of a scene of an entrance of a parking lot captured by the camera and the position of the vehicle at a point in time when the vehicle has stopped after having reached the entrance of the parking lot, the piece of information and the position of the vehicle being registered as parking lot information of the parking lot,
   the control apparatus being configured to determine whether or not the vehicle has reached the entrance of the parking lot by comparing the registered information regarding the characteristic point with the information regarding the characteristic point contained in the image of the surrounding region of the vehicle captured by the camera, and to assist a driver of the vehicle in parking the vehicle into the parking lot whose parking lot information has been registered, in the case where the control apparatus determines that the vehicle has reached the entrance of the parking lot whose parking lot information has been registered,
   wherein, when a distance between the vehicle and the entrance of the parking lot whose parking lot information has been registered becomes equal to or shorter than a threshold distance while the vehicle is traveling, the image processing apparatus extracts the characteristic point contained in the image of the surrounding region of the vehicle captured by the camera, and, when the distance is longer than the threshold distance, the image processing apparatus does not extract the characteristic point contained in the image of the surrounding region of the vehicle captured by the camera.

2. The parking assist apparatus according to claim 1, wherein the control apparatus registers, as the parking lot information, a first position which is the position at which the vehicle has stopped after having reached the entrance of the parking lot, a first direction which is a direction of the vehicle at the first position, and a direction in which the parking lot is present in relation to the vehicle located at the first position;

the control apparatus determines, through inference, whether the parking lot whose parking lot information has been registered is present on a left side or a right side of the vehicle, while the vehicle is traveling, on the basis of the registered parking lot information and a direction of the vehicle inferred on the basis of a change over time in the position of the vehicle obtained from the positioning apparatus; and the image processing apparatus extracts the characteristic point from an area which is a part of the surrounding region of the vehicle and is located on the side where presence of the parking lot whose parking lot information has been registered is inferred, and the image processing apparatus does not extract the characteristic point from an area which is another part of the surrounding region of the vehicle and is located on the side where presence of the parking lot whose parking lot information has been registered is not inferred.

3. The parking assist apparatus according to claim 1, wherein, when the vehicle starts to move from a parking lot for which the position of the vehicle at a point in time when the vehicle has stopped after having reached the entrance of the parking lot has not yet been registered, the control apparatus accumulatively stores a piece of travel history information which contains a change in travel direction and a travel distance of the vehicle from the parking lot, and in the case where it becomes possible to obtain the position of the vehicle from the positioning apparatus after the vehicle has started to move from the parking lot, the control apparatus back-calculates the position of the parking lot from the position of the vehicle and the travel history information, and registers, as the position of the parking lot, the position obtained through the back-calculation.

4. The parking assist apparatus according to claim 2, wherein, when the vehicle starts to move from a parking lot for which the first direction has not yet been registered, the control apparatus accumulatively stores a piece of travel history information which contains a change in travel direction from the parking lot, and in the case where it becomes possible, after the vehicle has started to move from the parking lot, to infer the direction of the vehicle on the basis of a change over time in the position of the vehicle obtained from the positioning apparatus, the control apparatus back-calculates the first direction from the inferred direction of the vehicle and the travel history information, and registers the first direction obtained through the back-calculation.

\* \* \* \* \*